(12) United States Patent
Lee et al.

(10) Patent No.: US 7,756,131 B2
(45) Date of Patent: Jul. 13, 2010

(54) PACKET FORWARDING SYSTEM CAPABLE OF TRANSFERRING PACKETS FAST THROUGH INTERFACES BY READING OUT INFORMATION BEFOREHAND FOR PACKET FORWARDING AND METHOD THEREOF

(75) Inventors: Jun-seo Lee, Seoul (KR); Nam-guk Kim, Seoul (KR); Woo-jong Park, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1052 days.

(21) Appl. No.: 10/978,401

(22) Filed: Nov. 2, 2004

(65) Prior Publication Data

US 2005/0129014 A1 Jun. 16, 2005

(30) Foreign Application Priority Data

Dec. 10, 2003 (KR) .................. 10-2003-0089535

(51) Int. Cl.
*H04L 12/28* (2006.01)
(52) U.S. Cl. .................. 370/392; 370/395.32
(58) Field of Classification Search .................. None
See application file for complete search history.

(56) References Cited

U.S. PATENT DOCUMENTS

| 4,872,157 | A | * | 10/1989 | Hemmady et al. | 370/400 |
|---|---|---|---|---|---|
| 5,432,908 | A | * | 7/1995 | Heddes et al. | 711/147 |
| 5,535,201 | A | * | 7/1996 | Zheng | 370/230.1 |
| 5,600,820 | A | * | 2/1997 | Johnston | 711/171 |
| 5,898,671 | A | * | 4/1999 | Hunt et al. | 370/235 |
| 5,940,369 | A | * | 8/1999 | Bhagavath et al. | 370/229 |
| 7,177,311 | B1 | * | 2/2007 | Hussain et al. | 370/392 |
| 2003/0142669 | A1 | * | 7/2003 | Kubota et al. | 370/389 |
| 2003/0227933 | A1 | * | 12/2003 | Eberle et al. | 370/419 |
| 2005/0220030 | A1 | * | 10/2005 | Nagami et al. | 370/241 |
| 2006/0056298 | A1 | * | 3/2006 | Nag et al. | 370/230 |
| 2007/0008970 | A1 | * | 1/2007 | Alex et al. | 370/392 |

OTHER PUBLICATIONS

Nian-Feng Tzeng, Hardware-assisted design for fast packet forwarding in parallel routers, Oct. 9, 2003, IEEE, International Conference on Parallel Processing, 2003, Proceedings, pp. 11-18.*

(Continued)

*Primary Examiner*—Jayanti K Patel
*Assistant Examiner*—Hooman Houshmand
(74) *Attorney, Agent, or Firm*—Staas & Halsey LLP

(57) ABSTRACT

A packet forwarding system to transfer packets through a plurality of interfaces by reading out information for the packet forwarding beforehand includes a packet processor that organizes and processes data to be transferred into packets, a packet memory storing the organized packets, a plurality of interfaces respectively transferring the packets stored in the packet memory depending on destinations of the packets, and a packet forwarding manager managing an packet information to transfer the packets through the plurality of the interfaces, respectively, and to control transfer of the packets immediately through a corresponding interface of the plurality of the interfaces by reading out the packet information before the packet forwarding. Accordingly, the fast packet forwarding is realized by processing the packet information read and the actual packet forwarding in parallel.

13 Claims, 7 Drawing Sheets

OTHER PUBLICATIONS

Yiluo Song, A parallel IP-address forwarding approach based on partitioned lookup table techniques, Nov. 16, 2004, IEEE, 29th Annual IEEE International Conference on Local Computer Networks, 2004, pp. 425-426.*

Chan, H.C.B. Alnuweiri, H.M. Leung, V.C.M., Cost and performance optimization in IP switched-routers, Aug. 22, 1999, IEEE, 1999 IEEE Pacific Rim Conference on Communications, Computers and Signal Processing, pp. 345-348.*

* cited by examiner

PACKET FORWARDING SYSTEM CAPABLE OF TRANSFERRING PACKETS FAST THROUGH INTERFACES BY READING OUT INFORMATION BEFOREHAND FOR PACKET FORWARDING AND METHOD THEREOF

CROSS-REFERENCE TO RELATED APPLICATIONS

This application claims the benefit of Korean Patent Application No. 2003-89535 filed on Dec. 10, 2003 in the Korean Intellectual Property Office, the disclosure of which is incorporated herein by reference in its entirety.

BACKGROUND OF THE INVENTION

1. Field of the Invention

The present invention concerns a packet forwarding system to transfer packets through a plurality of interfaces by reading out information for the packet forwarding beforehand and a method thereof.

2. Description of the Related Art

FIG. 1 is a schematic block diagram of a conventional packet forwarding system. Referring to FIG. 1, the packet forwarding system includes a packet processor 110, a controller 130, a transmit (TX) queue 150, a packet memory 160, and an interface part 170.

The packet processor 110 organizes incoming data into a suitable data unit (for example, an asynchronous transfer mode (ATM) cell) and generates an Internet protocol (IP) packet. The IP packet is organized into at least one subpacket of a fixed length. The subpackets (hereinafter, referred to as packet data) are stored in the packet memory 160.

The TX queue 150 buffers information including location information of the packet data for packet forwarding in sequential order starting from a head entry pointed to by a head pointer to a tail entry pointed to by a tail pointer, and operates in a first-in first-out (FIFO) process.

The TX queue 150 has a space to record information to transfer the packets including the location information of the IP packets of a maximum number M. The controller 130 transfers, through the interface part 170, the IP packets stored in the packet memory 160 based on the location information of the IP packets of the TX queue 150.

That is, the controller 130 controls the TX queue 150 to read out the packet data from the packet memory 160, and controls the packet memory 160 to transfer the packets to a destination in a predetermined order through the interface part 160.

In general, the storage medium of the TX queue 150 is a static random access memory (SRAM) having a high performance with respect to random operation. The storage medium of the packet memory 160 is a dynamic random access memory (DRAM) having a high performance with respect to burst operation.

Recently, the packet forwarding system for network devices such as routers, switches, and gateways, has been frequently utilized to transfer packets to diverse destinations through a plurality of output ports, that is, a plurality of interfaces.

Thus, packet information needs to be managed, that is, information for packet forwarding, such as information on the interface transferring the packets as well as the location information of the stored packet data and the information on the order of the packet forwarding. The TX queue 150 is used to manage the packet information.

In addition to the packet forwarding through the interfaces using the single TX queue 150, the packets may be transferred using a plurality of TX queues each for the plurality of the interfaces.

FIG. 2 illustrates packet forwarding using a single TX queue. Referring to FIG. 2, the packet processor 210 organizes data into packets, stores the packet data into the packet memory (not shown), and stores the information on the forwarding of the stored packets, that is, the packet information to the TX queue 250.

The TX queue 250 enqueues the information on the packet forwarding in order starting from the head entry pointed by the head pointer to the tail entry pointed by the tail pointer, and operates in the FIFO process. Hence, the packets are processed in order of the queue of the TX queue 250. That is, if the prior packet is not processed, the posterior packet is not processed as well.

The single TX queue 250 operating in the FIFO process manages the information of the packets transferred through the plurality of the interfaces 270-1 to 270-N of the interface part 270. If the packets are not transferred due to problems or congestion in the first interface 270-1, the second interface 270-2 cannot transfer the packet, and even if it is possible, since the second interface 270-2 cannot receive the information for the packet, forwarding from the TX queue 250 cannot take place. This disadvantage of packet forwarding using the single TX queue 250 is called 'head of line blocking'.

FIG. 3 illustrates packet forwarding using each of the plurality of the TX queues for the interface. Referring to FIG. 3, the plurality of the TX queues 350-1 to 350-N of the TX queue part 350 corresponds to the plurality of the interfaces 370-1 to 370-N of the interface part 370. Each TX queue 350-1 to 350-N has the same construction as the single TX queue 250 (FIG. 2), and operates independently. Hence, 'head of line blocking', the disadvantage of the single TX queue, does not arise.

However, the TX queues 350-1 to 350-N each have the space to record the information for packet forwarding, including the location information of the IP packets of the maximum number M as in the single TX queue. Consequently, the memory resource utilizes N times as much memory, and the memory resource is wasted.

SUMMARY OF THE INVENTION

To address the above and/or other disadvantages of the conventional arrangement, an exemplary aspect of the present invention is to provide a packet forwarding system and method to transfer packets efficiently by using a virtual TX queue to manage packet information and reading out the packet information from the virtual TX queue prior to the packet forwarding.

To achieve the above aspects and/or other features of the present invention, the packet forwarding system includes a packet processor organizing and processing data to be transferred into packets, a packet memory storing the packets, a plurality of interfaces respectively transferring the packets stored in the packet memory depending on destinations of the packets, and a packet forwarding manager managing a packet information for transferring the packets through the plurality of the interfaces, respectively, and controlling to immediately transfer the packets through a corresponding interface of the plurality of the interfaces by reading out the packet information before the packet forwarding.

The packet forwarding manager includes a forwarding buffer buffering the packet information separately for each of the plurality of the interfaces in a forwarding order of the packets, a forwarding confirmer confirming the packet forwarding of each of the plurality of the interfaces depending on the packet information, and generating a forwarding termination signal when any one of the plurality of the interfaces completes the packet forwarding, and a forwarding controller controlling a transfer of the packets by reading out from the forwarding buffer the packet information for a next packet to be transferred through the interface which completes the forwarding according to the generated forwarding termination signal and sending the read packet information to the forwarding confirmer.

The forwarding confirmer includes a plurality of output buffers respectively corresponding to the plurality of the interfaces, to store, temporarily, the packet information which is read from the forwarding buffer.

The forwarding controller uses a head pointer to point to a storage location of each of the packet information to be initially transferred through the plurality of the interfaces respectively and a tail pointer to point to a storage location of each of the packet information to be transferred so as to independently output the packet information stored in the forwarding buffer through the plurality of the interfaces.

The packet information of the packets, which is stored in the forwarding buffer, respectively, to be transferred through the plurality of the interfaces is stored in order using a link information which indicates a storage address of the packet information of a next packet to be transferred through the corresponding interface.

The packet information includes at least one of the destinations of the related packets, the interface selected to transfer the packets, the location information of the stored packets, and the order of the packet forwarding.

The packet forwarding method includes the operations of organizing and processing data to be transferred into packets, and storing the processed packets, storing packet information to transfer the stored packets respectively through any one of a plurality of interfaces depending on destinations, reading out and buffering a packet information of a next packet to be transferred through any one of the plurality of the interfaces which completes the packet forwarding, before the packet forwarding, and immediately transferring the packet through the corresponding interface using the next packet information read beforehand.

The packet forwarding method further includes the operation of confirming the packet forwarding of each of the plurality of the interfaces depending on the packet information, and generating a forwarding termination signal requesting a read-out of the next packet information when any one of the plurality of the interfaces completes the packet forwarding.

The operation of storing the packet information is performed in the forwarding order to independently output the packet information for each of the plurality of the interfaces. A head pointer that points to a storage location of each of the packet information to be transferred initially through the plurality of the interfaces respectively, and a tail pointer that points to a storage location of each of the packet information to be transferred at an end are used to output the packet information independently through the plurality of the interfaces.

The packet information of the packets respectively to be transferred through the plurality of the interfaces is stored in order using link information which indicates a storage address of the packet information of a next packet to be transferred through the corresponding interface.

The packet information contains at least one of the destinations of the related packets, the interface selected to transfer the packets, the location information of the stored packets, and the order of the packet forwarding.

BRIEF DESCRIPTION OF THE DRAWINGS

These and/or other aspects and advantages of the invention will become apparent and more readily appreciated from the following description of the embodiments, taken in conjunction with the accompanying drawing figures of which.

DETAILED DESCRIPTION OF THE PREFERRED EMBODIMENTS

Figure 1:
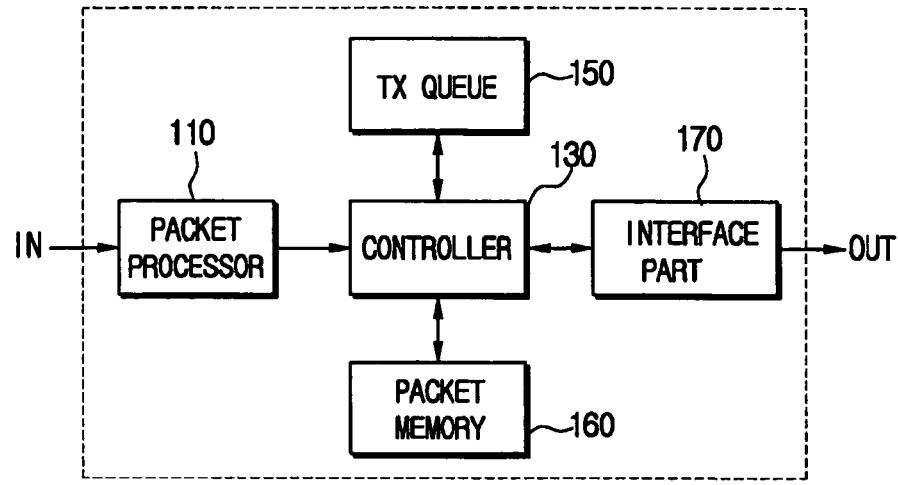
FIG. 1 is a block diagram illustrating a conventional packet forwarding system.

Reference will now be made in detail to exemplary embodiments of the present invention, examples of which are illustrated in the accompanying drawing figures, wherein like reference numerals refer to the like elements throughout. The embodiments are described below in order to explain the present invention by referring to the drawing figures.

Figure 4:
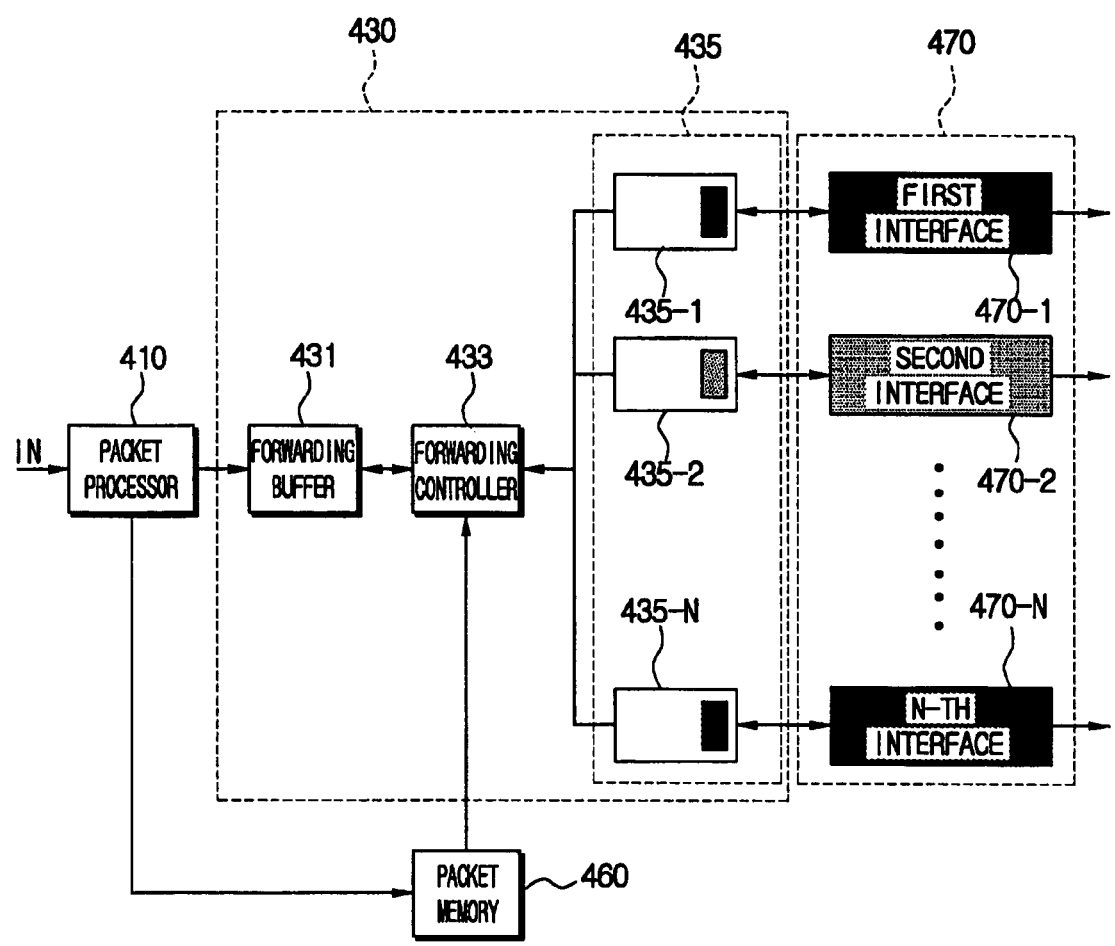
FIG. 4 is a block diagram illustrating a packet forwarding system according to an embodiment of the present invention.

FIG. 4 is a block diagram of a packet forwarding system to transfer packets efficiently by reading out packet information beforehand according to an embodiment of the present invention. The packet forwarding system includes a packet processor 410, a packet forwarding manager 430, and an interface part 470.

The packet processor 410 receives data by a certain data unit, for example, by a asynchronous transfer mode (ATM) cell, from an external network device, generates an internet protocol (IP) packet by organizing the incoming data to the certain data unit, for example, by removing a header of the ATM cell and organizing the ATM cell having no header, and stores the IP packet in a packet memory 460. The header of the IP packet contains a destination address, a source address, and various information on other packets.

The packet processor 410 classifies packets based on the information contained in the header of the IP packet, determines a destination of the classified packets, and selects an interface for forwarding the packet among a plurality of interfaces 470-1 to 470-N of the interface part 470 depending on the destination. The interface part 470 includes the plurality of the interfaces 470-1 to 470-N. Each packet is transferred through the selected one of the interfaces 470-1 to 470-N.

The packet forwarding manager 430 receives packet information for the packet forwarding, such as the destination of the forwarding packet, the selected interface for the packet forwarding, information on a location where the packet is stored in the packet memory 460, and a forwarding order of the packets.

The packet forwarding manager 430 controls forwarding the packets respectively through the plurality of the interfaces 470-1 to 470-N of the interface part 470 depending on the packet information for the packet forwarding such as the information on the location where the packet is stored in the packet memory 460, the destination of the forwarding packet, the selected interface, and the forwarding order of the packets.

The packet forwarding manager 430 includes a forwarding buffer 431, a forwarding controller 433, and a forwarding confirmer 435. The forwarding buffer 431 has a structure of a virtual transmit (TX) queue, which will be described below.

The forwarding buffer 431 buffers the packet information separately for each of the plurality of the interfaces 470-1 to 470-N in the forwarding order.

The forwarding confirmer 435 monitors a state of the interfaces 470-1 to 470-N, and generates a forwarding termination signal notifying that the packet forwarding is terminated in the related interface when any one of the interfaces 470-1 to 470-N completes the packet forwarding.

According to the forwarding termination signal of the forwarding confirmer 435, the forwarding controller 433 reads from the forwarding buffer 431 the packet information for the interfaces which completed the packet forwarding, to forward the next packet in order, and inputs the read packet information to the forwarding confirmer 435. In addition, the forwarding controller 433 controls the forwarding buffer 431 to buffer the information for the packet forwarding which is received from the packet processor 410, and controls the output of the forwarding buffer 431 using the location information of the packet information stored in the forwarding buffer 431.

The forwarding confirmer 435 includes a plurality of output buffers 435-1 to 435-N which temporarily stores the input packet information for the packet forwarding. The plurality of the output buffers 435-1 to 435-N corresponds to the plurality of the interfaces 470-1 to 470-N respectively. The output buffers 435-1 to 435-N temporarily store the packet information of the next packet to be transferred through the corresponding interface, which is read out and input from the forwarding buffer 431 before the actual packet forwarding.

Upon completing the packet forwarding, the interfaces 470-1 to 470-N transfer the next packet in order using the packet information of the next packet which is buffered in the corresponding output buffers 435-1 to 435-N of the forwarding confirmer 435, irrespective of the forwarding termination of the other interfaces.

Figure 3:
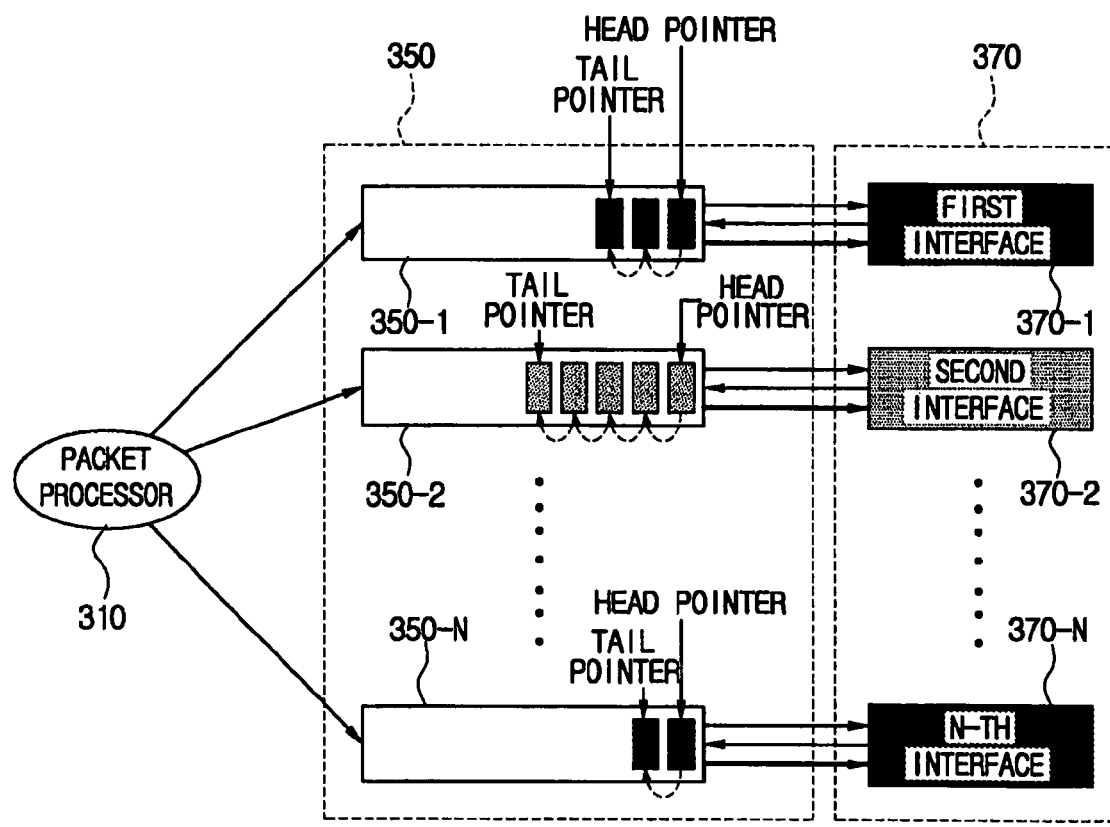
FIG. 3 is a diagram illustrating the packet forwarding using a plurality of TX queues, each of the plurality of TX queues corresponding to one of the plurality of interfaces.
Figure 5:
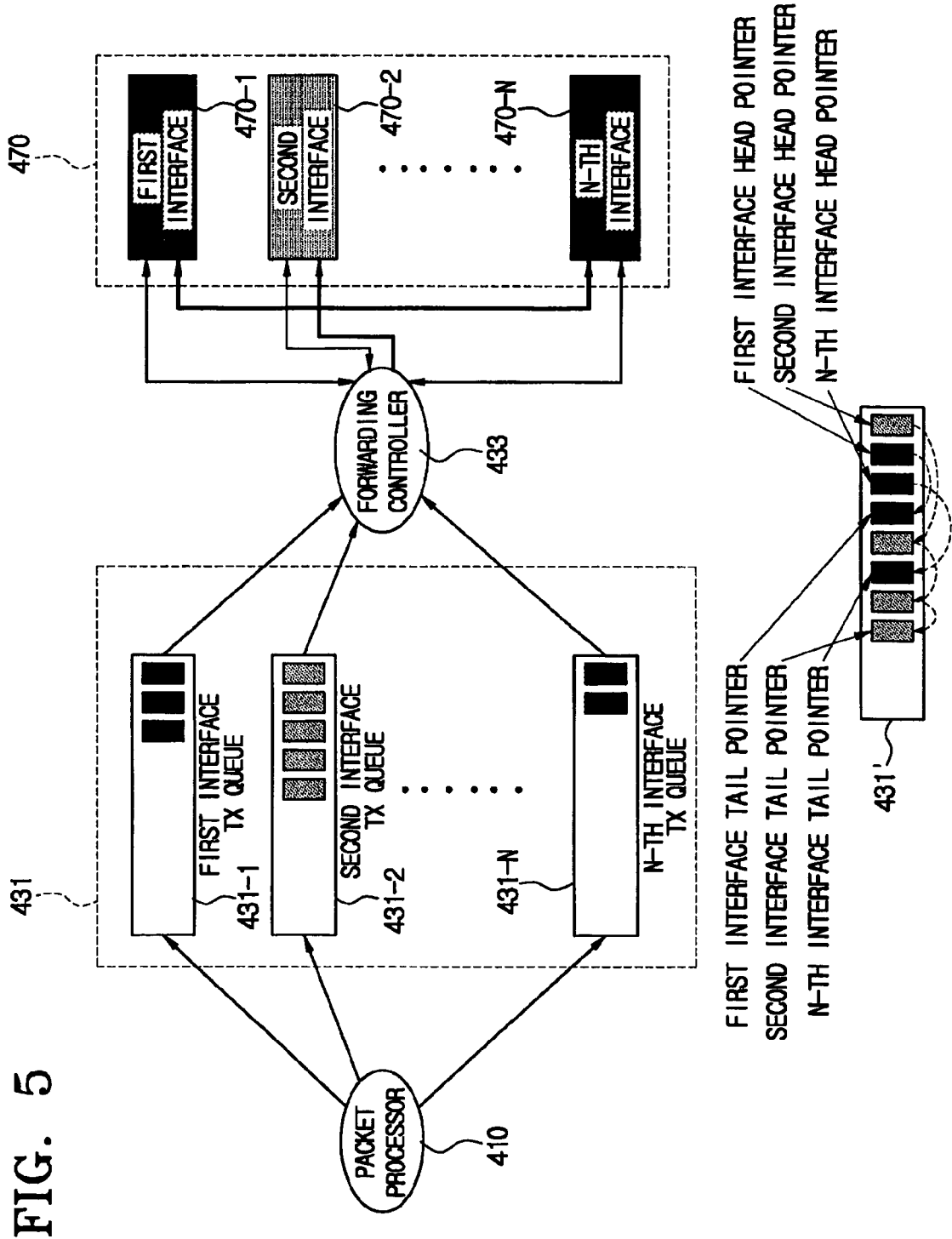
FIG. 5 is diagram illustrating a packet forwarding method using a virtual TX queue.

FIG. 5 illustrates a packet forwarding method using the virtual TX queue. The forwarding buffer 431 of FIG. 4 has the structure of the virtual TX queue. Referring to FIG. 5, the packet forwarding method using the virtual TX queue has an effect similar to that using a plurality of TX queues for the interfaces, that is, using TX queues 431-1 to 431-N, each corresponding to the interfaces 470-1 to 470-N. Unlike the TX queues of FIG. 3, the TX queues 431-1 to 431-N are not physical TX queues.

Still referring to FIG. 5, the physical structure of the virtual TX queue 431' manages the packet information for the packet forwarding through the interfaces 470-1 to 470-N, respectively, using N-ary head pointers and N-ary tail pointers. The forwarding controller 433 manages information on the head pointers and the tail pointers.

The packet information, which is to be transferred through one of the interfaces 470-1 to 470-N, is connected in a row like a string from the entry pointed by the related head pointer to the entry pointed to by the related tail pointer in the order of the packet forwarding, using link information representing entries storing the next packet information.

In detail, each entry in the physical structure of the virtual TX queue 431' has a field representing the link information. The link information field contains the link information representing address of the entry containing the next packet information which is to be transferred through a same interface.

When the entry of the forwarding buffer 431, which is pointed by the head pointer managed by the forwarding controller 433, outputs the packet information of the next packet to be transferred through the corresponding interface, the head pointer is updated and points the next entry represented by the link information of the related entry.

Since the entries containing the packet information corresponding to each interface are sequentially arranged in a row, like a string in the forwarding order depending on the link information, each interface independently outputs the next packet information upon completing the packet forwarding. Therefore, the same effect as in using the plurality of the TX queues for the interfaces is acquired, and the memory resource is saved since the memory space is substantially the same as in the packet forwarding method using the single TX queue.

Figure 2:
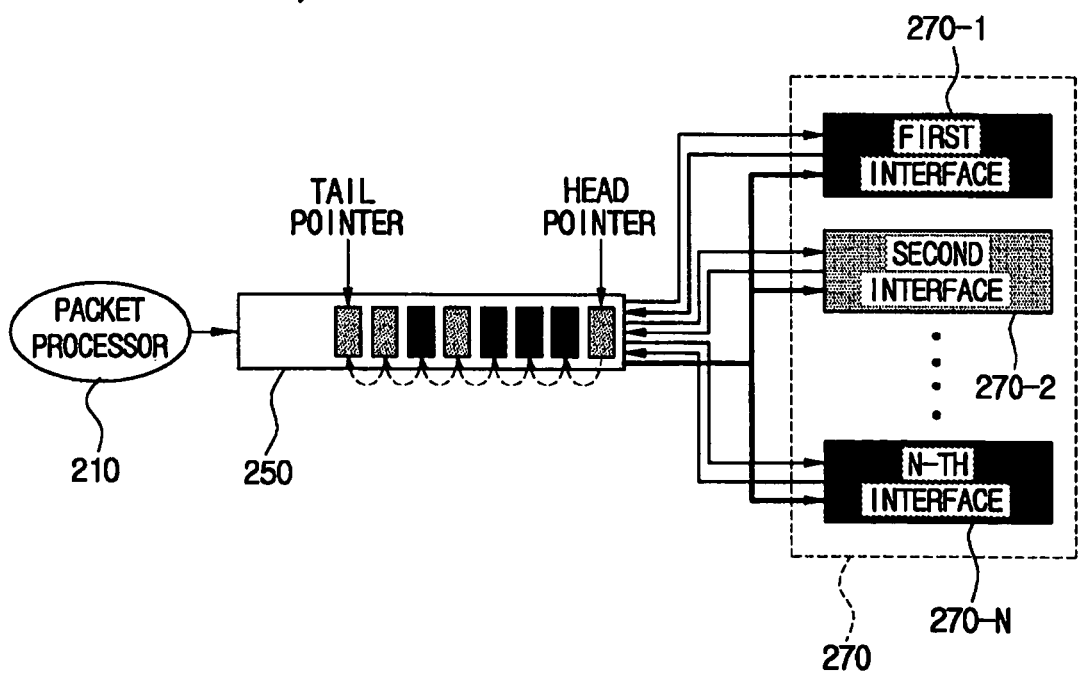
FIG. 2 is a diagram illustrating the packet forwarding using a single TX queue.
Figure 6A:
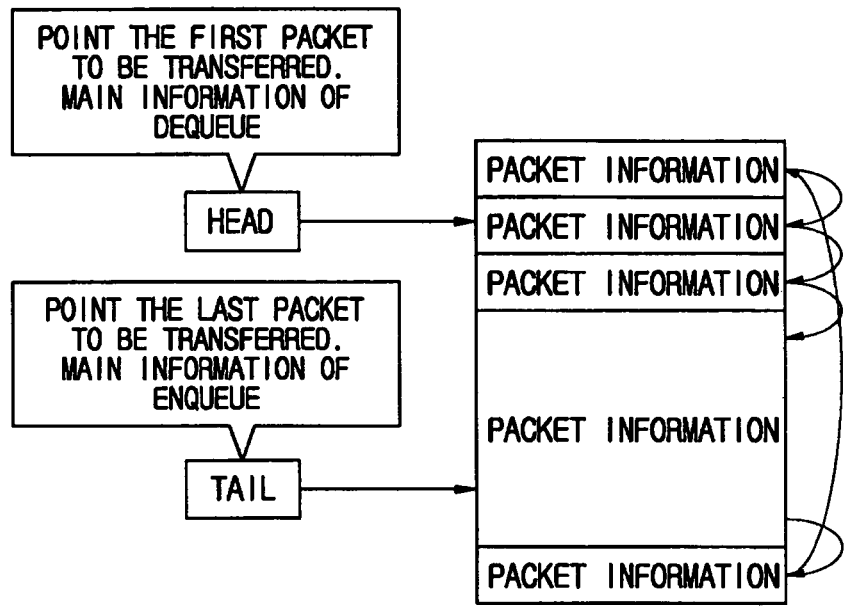
FIGS. 6A and 6B are diagrams illustrating the structural comparison between the memory of the single TX queue of FIG. 2 and that of the virtual TX queue of FIG. 5.
Figure 6B:
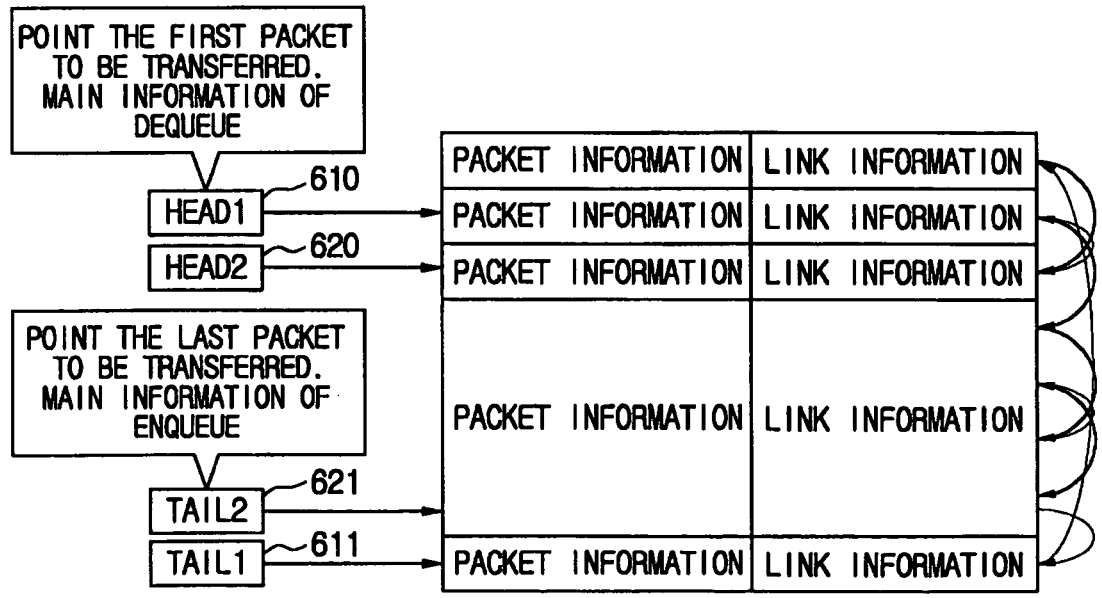

FIGS. 6A and 6B illustrate the comparison between the memory structure of the single TX queue of FIG. 2 and that of the virtual TX queue of FIG. 4. Referring to FIG. 6A, each entry of the single TX queue contains the packet information from the head entry to the tail entry in order of the packet forwarding, and does not separately contain the link information.

FIG. 6B illustrates the memory structure of the virtual TX queue, in which the number of the interfaces is two for the sake of brevity. Referring to FIG. 6B, the head pointer and the tail pointer are provided for each interface. The first head pointer 610 and the first tail pointer 611 are the location information representing the entry containing the packet information of the packet to be transferred through the first interface (not shown). The second head pointer 620 and the second tail pointer 621 are the location information representing the entry containing the packet information of the packet to be transferred through the second interface (not shown).

Each entry containing the packet information has the field containing the link information. The link information represents the entry containing the next packet information to be transferred through the corresponding interface. Thus, the packet information of the packet to be transferred through the first interface (not shown) is contained in the entry pointed by the first head pointer 610 in the forwarding order. The entry indicated by the link information of the entry pointed to by the first head pointer 610 contains the packet information of the next packet. As a result, the entry pointed to by the first head pointer 610 is linked through to the entry pointed by the first tail pointer 611 using the link information.

Figure 7:
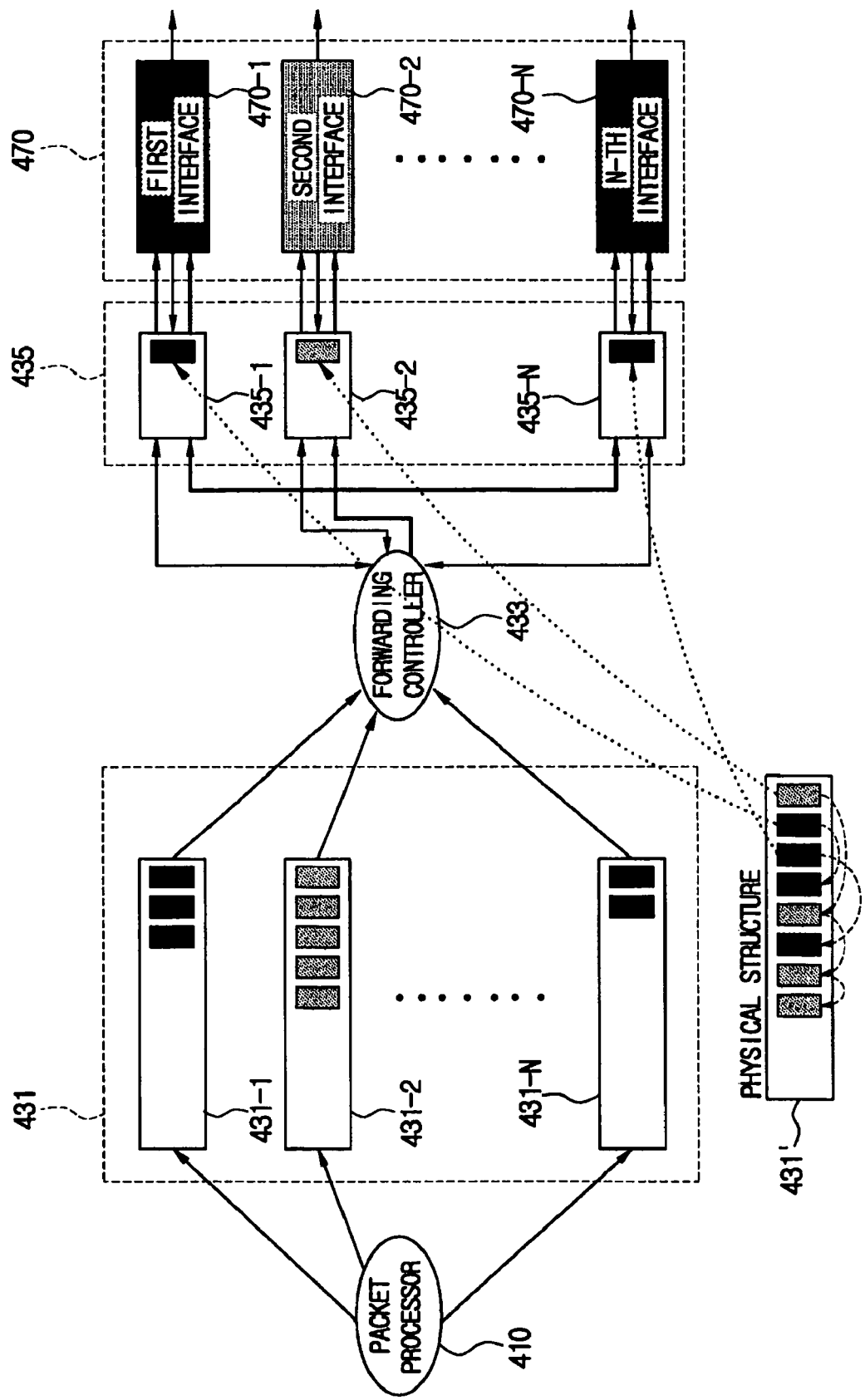
FIG. 7 is a diagram illustrating the packet forwarding method of the packet forwarding system of FIG. 4.

FIG. 7 illustrates the packet forwarding method of the packet forwarding system of FIG. 4; Since the virtual TX queue 431' does not operate in the FIFO process, the physical structure of the virtual TX queue 431' may output the packet information contained in the entry pointed by one of the N-ary head pointers irrespective of the storage order of the packet information.

For example, if the second interface 470-2 completes the packet forwarding and the forwarding confirmer 435 generates the forwarding termination signal, the forwarding controller 433 receives the forwarding termination signal, reads out the entry pointed by the second head pointer of the N-ary head pointers, that is, the packet information of the foremost packet in the forwarding order of the packet information contained in the second TX queue 431-2, and outputs the read packet information to the second output buffer 435-2 of the forwarding confirmer 435.

The input packet information is temporarily stored in the second output buffer 435-2 and is used for the second interface 470-2 to transfer the next packet. Hence, the packet forwarding of the second interface 470-2 is irrelevant to the packet forwarding termination of the other interfaces. The output of the packet information from the forwarding buffer 431 is processed in parallel separately from the actual packet forwarding to enhance the forwarding efficiency of the packets. When the TX queue and the components of the packet forwarding system access the static random access memory (SRAM), the access delay may be minimized by scheduling the series of the above-mentioned processes.

Figure 8:
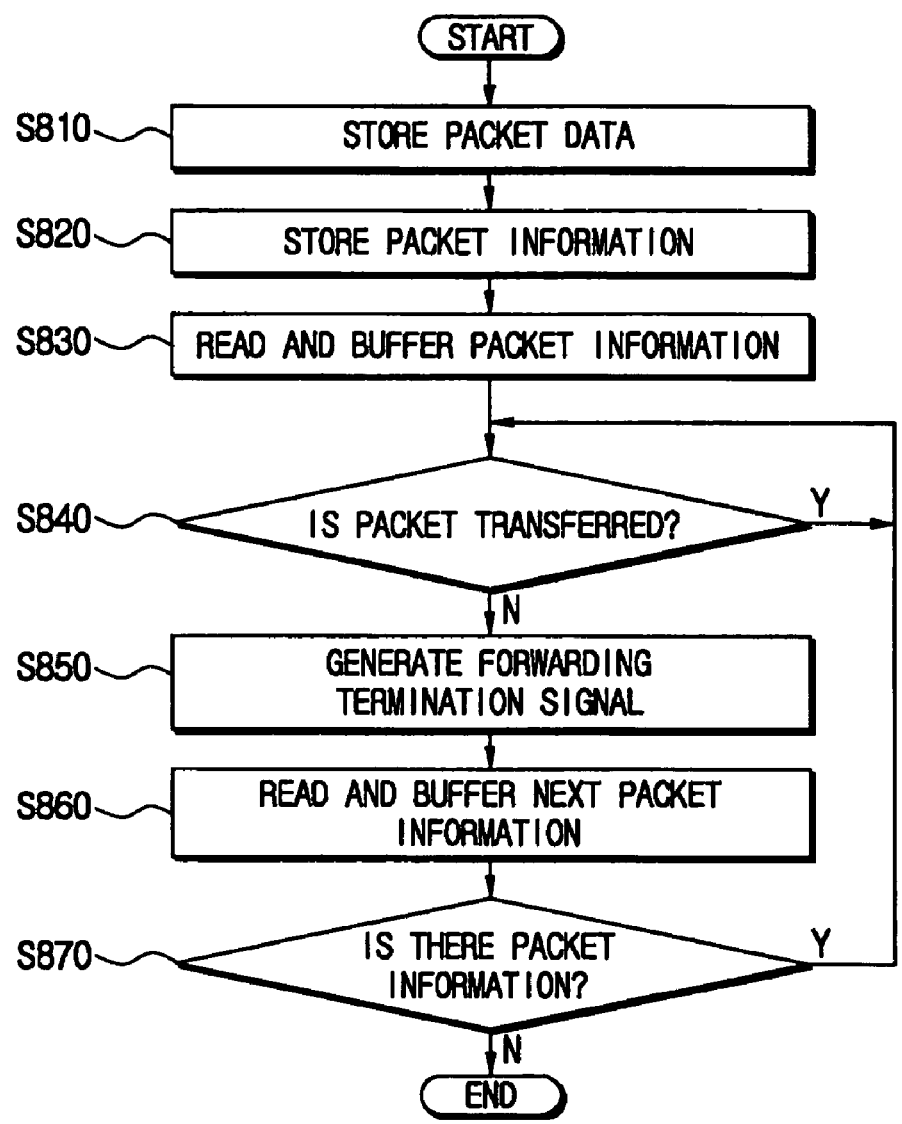
FIG. 8 is a flowchart illustrating exemplary operations of the packet forwarding system of FIG. 4.

FIG. 8 is a flowchart of operations of the packet forwarding system of FIG. 4. The packet data of the IP packet, which is generated by receiving data from the external network device and processing the received data in the packet processor 410, is stored in the packet memory 460 at operation S810.

The packet information such as the destination of the processed packet, the selected interface for the packet forwarding, the location information of the packet stored in the packet memory 460, and the forwarding order of the packet, is buffered in the forwarding buffer 431 at operation S820. The packet information is buffered in the forwarding buffer 431 respectively for the plurality of the interfaces 470-1 to 470-N in the forwarding order.

The packet information in the forwarding buffer 431 is read out under the control of the forwarding controller 433, is input to the forwarding confirmer 435, and is temporarily stored in the output buffer 435-1 to 435-N corresponding to the related interfaces 470-1 to 470-N at operation S830.

The forwarding confirmer 435 monitors the state of each interface to confirm the termination of the packet forwarding of the interfaces 470-1 to 470-N at operation S840. When any one of the interfaces 470-1 to 470-N completes the packet forwarding, the forwarding confirmer 435 generates the forwarding termination signal to notify that the related interface completed the packet forwarding at operation S850.

Depending on the forwarding termination signal of the forwarding confirmer 435, the forwarding controller 433 reads out from the forwarding buffer 431 the packet information to forward the next packet through the related interface which completed the packet forwarding, and inputs the read packet information to the forwarding confirmer 435 at operation S860.

The forwarding confirmer 435 temporarily stores the input packet information in the output buffer 435-1 to 435-N corresponding to the interface which is used to transfer the packet so as to use the input packet information for the next packet forwarding.

The forwarding controller 433 checks whether the forwarding buffer 431 still stores the packet information on the packet to be transferred using the head pointer and the tail pointer at operation S870. When the entire packet stored in the packet memory 460 is transferred, there is no more packet information. Accordingly, the packet forwarding is terminated.

In the light of the foregoing, the packet information is read out from the virtual TX queue for each interface before the packet forwarding so that the packet information read and the actual packet forwarding are processed in parallel. As a result, the packet forwarding reduces the required time.

The memory resource is saved by minimizing the memory capacity requirement for the management of the packet information. Even if a certain interface has the congestion, other interfaces may transfer the packets since the packet information is processed separately from the actual packet forwarding. Therefore, a total time for the packet forwarding is reduced, and efficient packet forwarding is feasible in the packet forwarding system.

The method of the present invention may be embodied as a program stored on a computer readable medium that can be run on a general computer. Here, the computer readable medium includes, but is not limited to, storage media such as magnetic storage media (e.g., ROM's, floppy disks, hard disks, and the like), and optically readable media (e.g., CD-ROMs, DVDs, etc.). The present invention may also be embodied as a computer readable program code unit stored on a computer readable medium, for causing a number of computer systems connected via a network to affect distributed processing.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A packet forwarding system comprising:
 a packet processor organizing and processing data to be transferred into packets;
 a packet memory storing the packets;
 a plurality of interfaces respectively transferring the packets stored in the packet memory depending on destinations of the packets; and
 a packet forwarding manager managing packet information to transfer the packets through the plurality of the interfaces, respectively, and controlling a transfer of each of the packets through a corresponding interface of the plurality of the interfaces by reading out packet information before the packet forwarding,
 wherein the packet forwarding manager comprises:
 a forwarding buffer having a structure of a virtual transmission (TX) queue wherein each entry in a physical structure of the virtual TX queue has a field representing link information, and wherein the forward buffer buffers the packet information separately for each of the plurality of the interfaces in a forwarding order of the packets;
 a forwarding confirmer confirming packet forwarding of each of the plurality of the interfaces depending on the packet information, and generating a forwarding termination signal when any one of the plurality of the interfaces completes the packet forwarding; and
 a forwarding controller controlling a transfer of the packets by reading out from the forwarding buffer the packet information for a next packet to be transferred through the interface which completes the forwarding according to the generated forwarding termination signal and sending the read packet information to the forwarding confirmer,
 wherein the forwarding controller uses a head pointer pointing to a storage location of each of the packet information to be transferred initially through the plurality of the interfaces respectively and a tail pointer pointing to a storage location of each of the packet information to be transferred last so as to independently output the packet information stored in the forwarding buffer through the plurality of the interfaces so that the output of the packet information is processed in parallel separately from the packet forwarding to enhance forwarding efficiency of the packets, wherein the forwarding confirmer comprises a plurality of output buffers respectively corresponding to the plurality of the interfaces, for storing, temporarily, the packet information which is read from the forwarding buffer.

2. The packet forwarding system of claim 1, wherein the packet information of the packets, which is stored in the forwarding buffer, respectively to be transferred through the plurality of the interfaces is stored in order using link information which indicates a storage address of the packet information of a next packet to be transferred through the corresponding interface.

3. The packet forwarding system of claim 1, wherein the packet information comprises at least one of the destinations of the related packets, an interface selected to transfer the packets, a location information of the stored packets, and an order of the packet forwarding.

4. A packet forwarding method comprising:
   organizing and processing data to be transferred into packets, and storing the processed packets;
   storing packet information to transfer the stored packets respectively through any one of a plurality of interfaces depending on respective destinations;
   reading out and buffering the packet information of a next packet to be transferred through any one of the plurality of the interfaces which completes the packet forwarding, before packet forwarding, wherein a forwarding buffer has a structure of a virtual transmission (TX) queue and wherein each entry in a physical structure of the virtual TX queue has a field representing link information;
   immediately transferring the packet through the corresponding interface using the next packet information read beforehand;
   confirming the packet forwarding of each of the plurality of the interfaces depending on the packet information, and generating a forwarding termination signal requesting a read-out of the next packet information when any one of the plurality of the interfaces completes the packet forwarding; and
   temporarily storing the packet information which corresponds to each of the plurality of interfaces and is read and transmitted from the forwarding buffer,
   wherein the storing the packet information is performed in the forwarding order so as to independently output the packet information for each of the plurality of the interfaces, and
   wherein a head pointer pointing to a storage location of each of the packet information to be transferred initially through the plurality of the interfaces respectively and a tail pointer pointing to a storage location of each of the packet information to be transferred last are used so as to independently output the packet information through the plurality of the interfaces so that the output of the packet information is processed in parallel separately from the packet forwarding to enhance forwarding efficiency of the packets,
   wherein the packet information contains at least one of the destinations of the related packets, an interface selected to transfer the packets, location information of the stored packets, and an order of the packet forwarding.

5. The packet forwarding method of claim 4, wherein the packet information of the packets respectively to be transferred through the plurality of the interfaces is stored in order using link information which indicates a storage address of the packet information of a next packet to be transferred through the corresponding interface.

6. A computer readable storage medium having embodied thereon a computer program having a computer readable program code to execute a packet forwarding method, the computer readable program code including instructions comprising:
   organizing and processing data to be transferred into packets, and storing the processed packets;
   storing packet information to transfer the stored packets respectively through any one of a plurality of interfaces depending on respective destinations;
   reading out and buffering the packet information of a next packet to be transferred through any one of the plurality of the interfaces which completes the packet forwarding, before packet forwarding, wherein a forwarding buffer has a structure of a virtual transmission (TX) queue and wherein each entry in a physical structure of the virtual TX queue has a field representing link information;
   immediately transferring the packet through the corresponding interface using the next packet information read beforehand;
   comprising instructions confirming the packet forwarding of each of the plurality of the interfaces depending on the packet information, and generating a forwarding termination signal requesting a read-out of the next packet information when any one of the plurality of the interfaces completes the packet forwarding; and
   temporarily storing the packet information which corresponds to each of the plurality of interfaces and is read and transmitted from the forwarding buffer,
   wherein the instructions perform storing the packet information in the forwarding order so as to independently output the packet information for each of the plurality of the interfaces, and
   wherein the instructions utilize a head pointer pointing to a storage location of each of the packet information to be transferred initially through the plurality of the interfaces respectively and a tail pointer pointing to a storage location of each of the packet information to be transferred last are used so as to independently output the packet information through the plurality of the interfaces so that the output of the packet information is processed in parallel separately from the packet forwarding to enhance forwarding efficiency of the packets,
   wherein the packet information contains at least one of the destinations of the related packets, an interface selected to transfer the packets, location information of the stored packets, and an order of the packet forwarding.

7. The computer readable storage medium of claim 6, wherein the instructions store packet information of the packets respectively to be transferred through the plurality of the interfaces in order using a link information which indicates a storage address of the packet information of a next packet to be transferred through the corresponding interface.

8. A packet forwarding system comprising:
   a packet processor organizing and processing data to be transferred into packets;
   a packet memory storing the packets; and
   a packet forwarding manager managing packet information to transfer the packets to a plurality of the interfaces, respectively, and controlling a transfer of each of the packets by reading out packet information before the packet forwarding,
   wherein the packet forwarding manager comprises:
   a forwarding buffer having a structure of a virtual transmission (TX) queue and wherein each entry in a physical structure of the virtual TX queue has a field representing link information and wherein the forwarding buffer buffers the packet information separately for each of the plurality of the interfaces in a forwarding order of the packets;

a forwarding confirmer confirming packet forwarding of each of the plurality of the interfaces depending on the packet information, and generating a forwarding termination signal when any one of the plurality of the interfaces completes the packet forwarding; and a forwarding controller controlling a transfer of the packets by reading out from the forwarding buffer the packet information for a next packet to be transferred through the interface which completes the forwarding according to the generated forwarding termination signal and sending the read packet information to the forwarding confirmer, wherein the forwarding controller uses a head pointer pointing to a storage location of each of the packet information to be transferred initially through the plurality of the interfaces respectively and a tail pointer pointing to a storage location of each of the packet information to be transferred last so as to independently output the packet information stored in the forwarding buffer through the plurality of the interfaces so that the output of the packet information is processed in parallel separately from the packet forwarding to enhance forwarding efficiency of the packets, wherein the forwarding confirmer comprises a plurality of output buffers respectively corresponding to the plurality of the interfaces, for storing, temporarily, the packet information which is read from the forwarding buffer.

9. The packet forwarding system of claim 8, further including a plurality of interfaces, wherein the packet forwarding manager transfers the packets stored in the packet memory depending on destinations of the packets.

10. The packet forwarding system of claim 8, wherein the packet information of the packets, which is stored in the forwarding buffer, respectively to be transferred through the plurality of the interfaces is stored in order using link information which indicates a storage address of the packet information of a next packet to be transferred through the corresponding interface.

11. The packet forwarding system of claim 8, wherein the packet information comprises at least one of the destinations of the related packets, an interface selected to transfer the packets, a location information of the stored packets, and an order of the packet forwarding.

12. A packet forwarding method comprising:
organizing and processing data to be transferred into packets, and storing the processed packets;

storing packet information to transfer the stored packets respectively through any one of a plurality of interfaces depending on respective destinations;

reading out and buffering the packet information of a next packet to be transferred using the next packet information read beforehand wherein a forwarding buffer has a structure of a virtual transmission (TX) queue;

immediately transferring the packet through a plurality of corresponding interfaces to complete the packet forwarding;

confirming the packet forwarding of each of the plurality of the interfaces depending on the packet information, and generating a forwarding termination signal requesting a read-out of the next packet information when any one of the plurality of interfaces completes the packet forwarding; and temporarily storing the packet information which corresponds to each of the plurality of interfaces and is read and transmitted from the forwarding buffer, wherein each entry in a physical structure of the virtual TX queue has a field representing link information, wherein the packet information of the packets to be transferred through any one of the plurality of the interfaces is stored in order using the link information which indicates a storage address of the packet information of a next packet to be transferred through the corresponding interface, and wherein the storing the packet information is performed in the forwarding order so as to independently output the packet information for each of the plurality of the interfaces so that the output of the packet information is processed in parallel separately from packet forwarding to enhance forwarding efficiency of the packets, wherein the packet information contains at least one of the destinations of the related packets, an interface selected to transfer the packets, location information of the stored packets, and an order of the packet forwarding.

13. The packet forwarding method of claim 12, further including using a head pointer pointing to a storage location of each of the packet information to be transferred initially through the plurality of the interfaces respectively and a tail pointer pointing to a storage location of each of the packet information to be transferred last so as to independently output the packet information through the plurality of the interfaces.

* * * * *